United States Patent
Himmelmann

(10) Patent No.: US 8,760,015 B2
(45) Date of Patent: Jun. 24, 2014

(54) COOLING OF PERMANENT MAGNET ELECTRIC MACHINE

(75) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 219 days.

(21) Appl. No.: 13/030,751

(22) Filed: Feb. 18, 2011

(65) Prior Publication Data

US 2012/0212083 A1   Aug. 23, 2012

(51) Int. Cl.
*H02K 9/08* (2006.01)
*H02K 9/18* (2006.01)

(52) U.S. Cl.
USPC ............. 310/58; 310/59; 310/60 R; 310/60 A

(58) Field of Classification Search
USPC ................. 310/52–59, 60 R, 61–63, 60 A, 64
See application file for complete search history.

(56) References Cited

U.S. PATENT DOCUMENTS

| | | | |
|---|---|---|---|
| 4,514,652 A | 4/1985 | Olson | |
| 4,647,805 A | 3/1987 | Flygare et al. | |
| 4,745,315 A * | 5/1988 | Terry et al. | 310/68 D |
| 4,839,547 A * | 6/1989 | Lordo et al. | 310/60 A |
| 4,862,024 A | 8/1989 | Stingle et al. | |
| 4,994,700 A | 2/1991 | Bansal et al. | |
| 5,343,104 A * | 8/1994 | Takahashi et al. | 310/90 |
| 5,363,003 A * | 11/1994 | Harada et al. | 310/67 R |
| 5,610,464 A * | 3/1997 | Asano et al. | 310/156.45 |
| 5,767,601 A * | 6/1998 | Uchiyama | 310/190 |
| 5,833,022 A * | 11/1998 | Welke | 180/65.25 |
| 6,093,984 A * | 7/2000 | Shiga et al. | 310/26 |
| 6,437,468 B2 | 8/2002 | Stahl et al. | |
| 6,727,609 B2 | 4/2004 | Johnsen | |
| 7,009,317 B2 * | 3/2006 | Cronin et al. | 310/54 |
| 7,327,055 B2 | 2/2008 | Devine | |
| 7,701,095 B2 | 4/2010 | Gizaw et al. | |
| 7,808,136 B2 | 10/2010 | Knauff | |
| 7,911,091 B2 * | 3/2011 | Takenaka et al. | 310/54 |
| 8,016,574 B2 * | 9/2011 | De Filippis et al. | 417/423.8 |
| 2001/0048260 A1* | 12/2001 | Shiga et al. | 310/156.01 |
| 2006/0103253 A1* | 5/2006 | Shiga et al. | 310/156.45 |
| 2007/0029886 A1* | 2/2007 | Shiga | 310/68 B |
| 2009/0142203 A1* | 6/2009 | De Filippis et al. | 417/353 |

FOREIGN PATENT DOCUMENTS

JP   2007325436 A   * 12/2007

* cited by examiner

*Primary Examiner* — Tran Nguyen
(74) *Attorney, Agent, or Firm* — Cantor Colburn LLP

(57) ABSTRACT

A cooling system for a sealed permanent magnet electric machine includes one or more flow driving devices disposed at a rotor of the electric machine configured to urge an airflow across a plurality of permanent magnets of the rotor and across a plurality of stator end turns of the electric machine to remove thermal energy therefrom. A plurality of cooling channels are located in the electric machine in thermal communication with the stator configured to transfer thermal energy from the stator to a flow of fluid coolant through the plurality of cooling channels. A heat exchanger is in thermal communication with the plurality of cooling channels to transfer thermal energy from the airflow to the fluid coolant.

20 Claims, 3 Drawing Sheets

COOLING OF PERMANENT MAGNET ELECTRIC MACHINE

BACKGROUND OF THE INVENTION

The subject matter disclosed herein relates to electric machines. More specifically, the subject disclosure relates to cooling of permanent magnet electric machines.

Permanent magnet electric machines such as motors and generators have been in use for many years. Permanent magnet machines have been favored over other types due to their efficiency, simplicity, robustness and tolerance to large radial air gaps between the rotor and the stator of the machine. Permanent magnet machines, however, require cooling of the permanent magnets to prevent demagnetization of the permanent magnets. This begins to occur generally for some magnet materials when the permanent magnets exceed a temperature of about 200 degrees Celsius, while others can begin to demagnetize at lower temperatures. Once demagnetization occurs, the electric machine is no longer capable of meeting specified performance targets.

Several methods to prevent demagnetization are typically used. First, the machine may be designed with enough excess capability to reduce the magnet thermal load. This, however, results in machines that are overly physically large. Other machines utilize a fan to introduce relatively cool air to the permanent magnet surfaces. This type of cooling cannot be used, however, when the machine needs to be sealed from the outside environment. A third method is to flood the rotor cavity of the machine with coolant. This is useful in machines that must be sealed from the outside environment, but windage losses on the rotor, due to the presence of the coolant can impact efficiency of the machine rather severely. A fourth method utilizes an active system where coolant is sprayed directly onto the magnets or is circulated through the rotor assembly. This approach typically requires a lubrication system and scavenge system, especially if the machine cannot gravity drain.

BRIEF DESCRIPTION OF THE INVENTION

According to one aspect of the invention, a cooling system for a sealed permanent magnet electric machine includes one or more flow driving devices disposed at a rotor of the electric machine configured to urge an airflow across a plurality of permanent magnets of the rotor and across a plurality of stator end turns of the electric machine to remove thermal energy therefrom. A plurality of cooling channels are located in the electric machine in thermal communication with the stator configured to transfer thermal energy from the stator to a flow of fluid coolant through the plurality of cooling channels. A heat exchanger is in thermal communication with the plurality of cooling channels to transfer thermal energy from the airflow to the fluid coolant.

According to another aspect of the invention, a permanent magnet electric machine includes a rotor including a plurality of permanent magnets and a stator in magnetic communication with the rotor and positioned defining a radial air gap between the rotor and the stator. A housing is configured to seal the rotor and the stator from an outside environment. A plurality of fan blades are secured to the rotor and configured to urge an airflow across the plurality of permanent magnets and across a plurality of stator end turns of the stator to remove thermal energy therefrom. A plurality of cooling channels are located in the electric machine in thermal communication with the stator and are configured to transfer thermal energy from the stator to a flow of fluid coolant through the plurality of cooling channels. A heat exchanger is located in thermal communication with the plurality of cooling channels to transfer thermal energy from the airflow to the fluid coolant.

According to yet another aspect of the invention, a method of cooling a sealed permanent magnet electric machine includes moving a flow of fluid coolant through a plurality of cooling channels in thermal communication with a stator of the electric machine and transferring thermal energy from the stator to the fluid coolant flowing through the plurality of cooling channels. A circulation of air inside of the housing is urged via rotation of a plurality of fan blades about a machine axis of the electric machine. The circulation of air is directed past a plurality of permanent magnets of a rotor of the electric machine and past a plurality of stator end turns of the stator. Thermal energy is transferred from the plurality of permanent magnets and from the plurality of stator end turns to the air and the thermal energy is transferred from the air to the fluid coolant.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
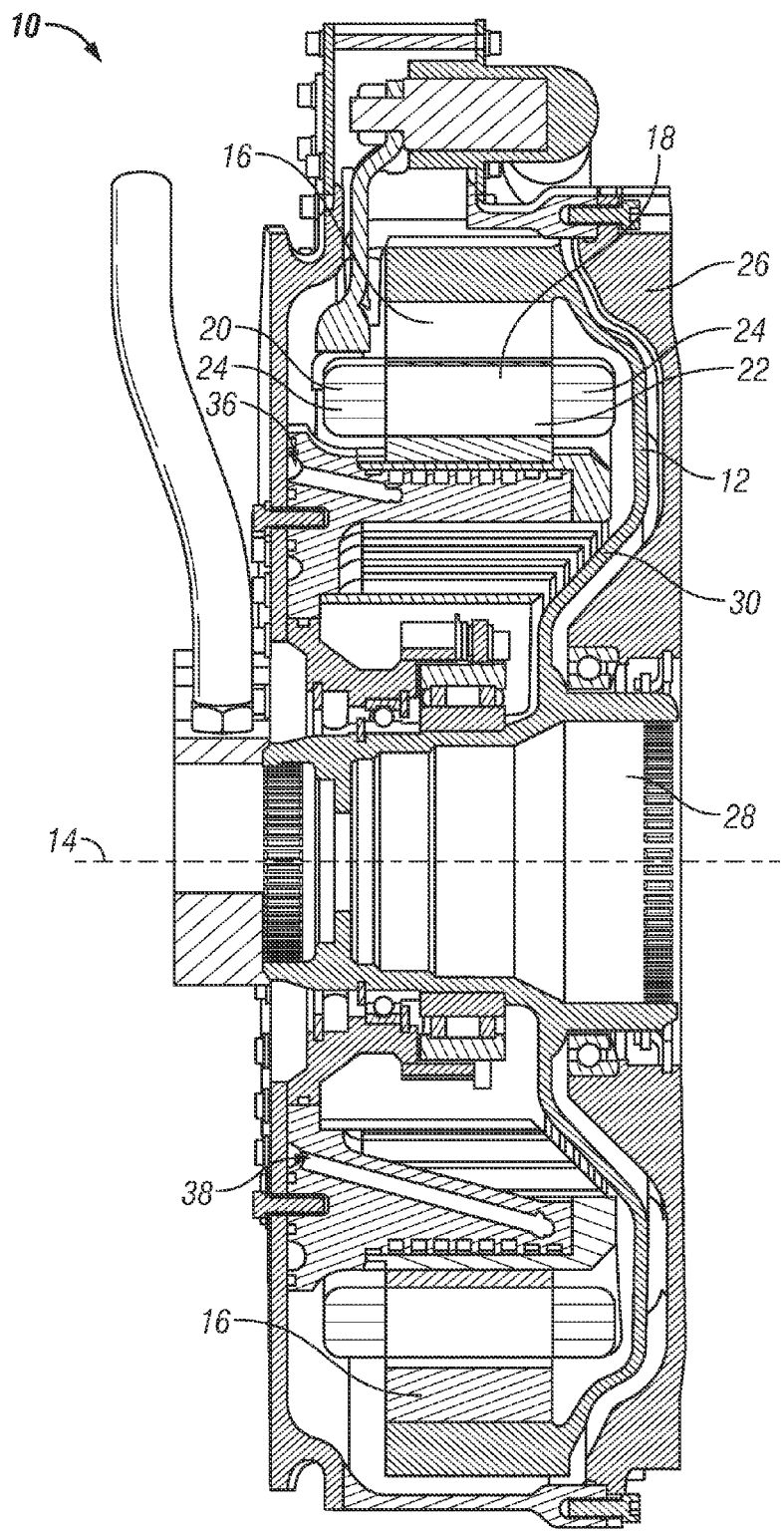
FIG. 1 is a cross-sectional view of an embodiment of an electric machine.

Shown in FIG. 1 is a cross-sectional view of a permanent magnet electric machine 10. The electric machine 10 includes a rotor 12 rotatably located at an electric machine axis 14. The rotor 12 includes a plurality of permanent magnets 16. The electric machine of FIG. 1 is an inside out electric machine, meaning that the plurality of permanent magnets 16 are located radially outboard of a stator 18. The stator 18 includes at least one stator winding 20 located at a stator core 22 and having a plurality of end turns 24 where the winding 20 emerges from the stator core 22, and changes direction to reenter the stator core 22. The stator winding 20 is magnetically interactive with the permanent magnets 16. The rotor 12 and stator 18 are located inside of a housing 26 which seals the electric machine 10 from the outside environment.

To locate the permanent magnets 16 radially outboard of the stator 18, the rotor 12 includes a rotor hub 28 located at the axis 14. A rotor disc 30, which may also take the form of, for example, a plurality of rotor arms, extends radially outwardly from the rotor hub 28. The plurality of permanent magnets 16 are supported by the rotor disc 30 radially outboard of the stator 18.

Figure 2:
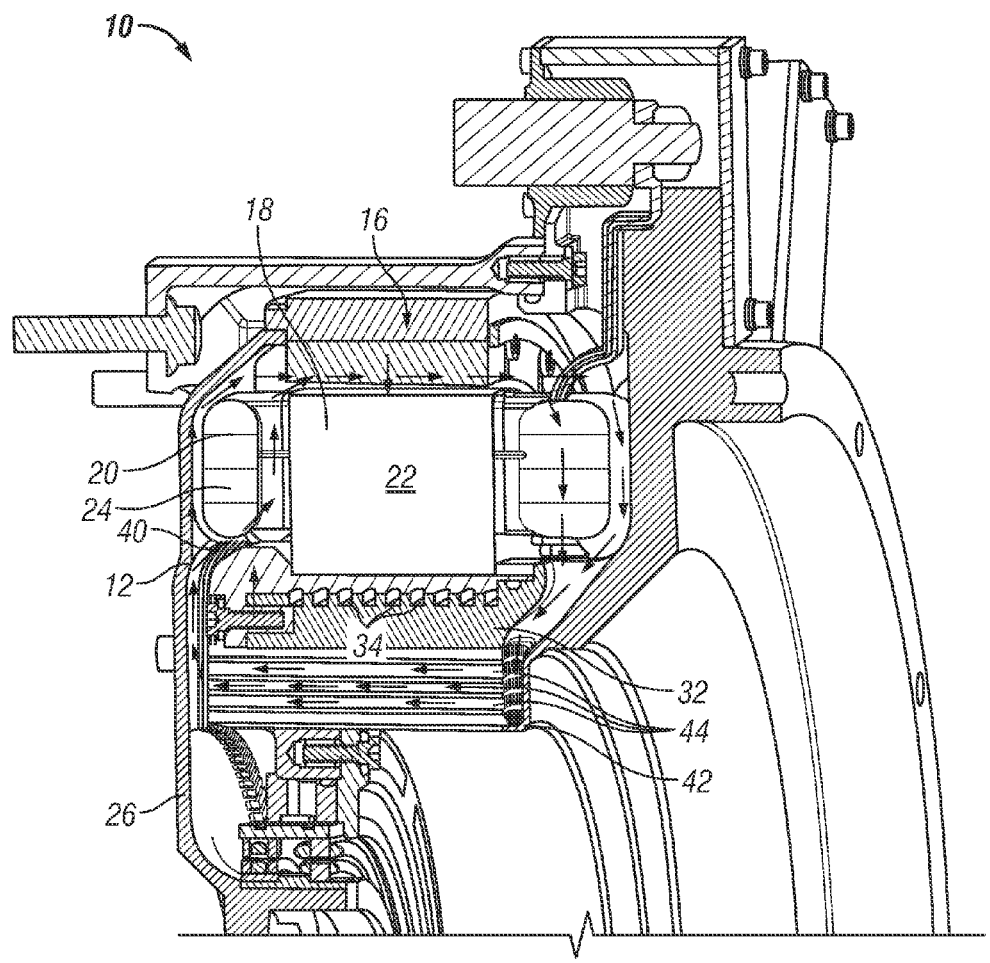
FIG. 2 is another cross-sectional view of an embodiment of an electric machine.

FIG. 2 illustrates a flow of cooling matter through the electric machine 10. Two cooling loops circulate cooling matter through the electric machine 10. A liquid cooling block 32 is located radially inboard of the stator 18 and substantially abuts the stator core 22 or other stator 18 component, such as the stator winding 20. The liquid cooling block 32 includes a plurality of cooling channels 34 arranged therein. In some embodiments, the plurality of cooling channels 34 extend circumferentially around the electric machine 10. It is to be appreciated, however, that other arrangements of cooling channels 34, for example labyrinthine or axially-extending cooling channels 34 or cooling pins/fins are contemplated within the scope of the present disclosure. While the coolant channels 34 of the pictured embodiment are located in the cooling block 32, it is to be appreciated that in some embodiments the coolant block 32 is not utilized and the cooling channels may be located, for example, directly in the stator core 22.

Figure 3:
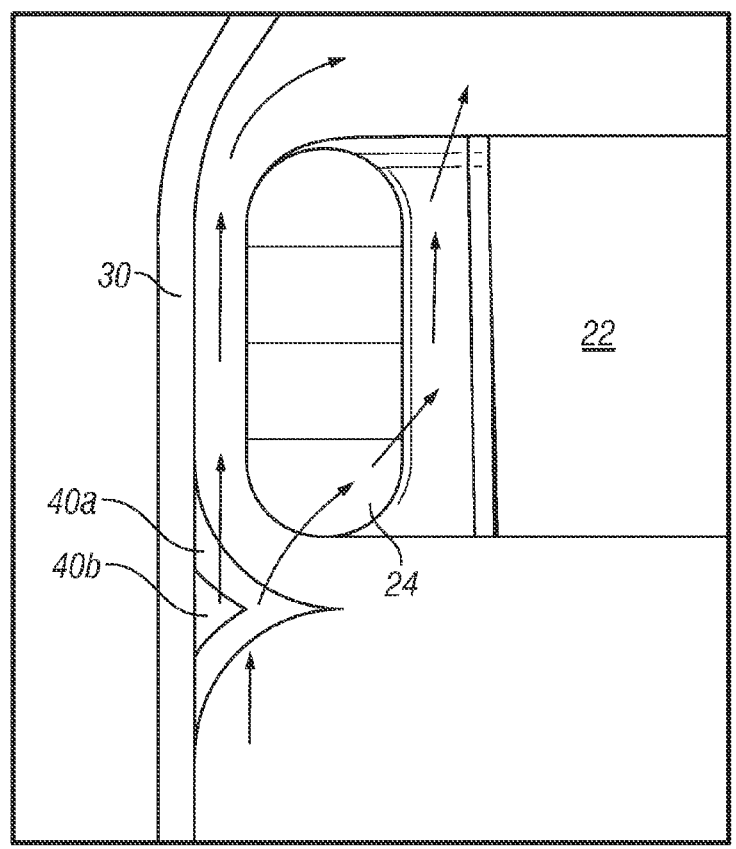
FIG. 3 is a partial cross-sectional view of an embodiment of a rotor of an electric machine.

One or more coolant inlets 36 and one or more coolant outlets 38 (shown in FIG. 1) are located in the cooling block 32 and are connected to the plurality of cooling channels 34 for input of coolant to and output of coolant from the plurality of cooling channels 34. In some embodiments, the coolant inlets 36 and coolant outlets extend through the housing 26. The coolant is, for example, water, or a mixture of water and ethylene glycol, or a mixture of water and propylene glycol, oil, forced air, liquid salt, or any other suitable fluid or gas. Coolant is input into the plurality of cooling channels 34 via the one or more coolant inlets 36 from a coolant source (not shown). As the coolant flows through the plurality of cooling channels 34, as shown in FIG. 3, thermal energy is transferred to the coolant from the stator 18. The coolant flows through the plurality of cooling channels 34 without entering the rotor 12. The coolant exits the housing 26 via the one or more coolant outlets 38 and the thermal energy is dissipated external to the electric machine 10.

The electric machine 10 further includes an air cooling circuit. Even though the electric machine 10 is sealed from the outside environment, a volume of air is present inside the housing 26. Rotation of the rotor 12 urges a flow of air radially outwardly toward the stator end turns 24 and the plurality of permanent magnets 16. To facilitate this flow or air, one or more flow-driving devices are disposed at the rotor 12. For example, as shown in FIG. 2, the rotor 12 includes a plurality of fan blades 40 secured to, or integral to, the rotor disc 30. The plurality of fan blades 40 are located radially inboard of the stator end turns 24 and are secured top the rotor disc 26 such that rotation of the rotor 12 about the machine axis 14 drives rotation of the fan blades 40 about the machine axis 14. The fan blades 40 add head to the volume of air in the housing 26 forcing the air toward the permanent magnets 16 and/or the stator end turns 24.

As shown in more detail in FIG. 3, the plurality of fan blades 40 may have more than one configuration. For example, tall fan blades 40a are configured to direct air directly toward the stator end turns 24, while short fan blades 40b interposed between tall fan blades 40a allow at least a portion of the flow of air to bypass the stator end turns and flow directly to the permanent magnets 16.

Referring again to FIG. 2, a portion of the flow of air flows past and through the stator end turns 24, removing thermal energy therefrom. Another portion of the flow of air flows across the plurality of permanent magnets 16, removing thermal energy from the permanent magnets 16. The airflow then is urged through a water to air heat exchanger 42. The heat exchanger 42 includes a plurality of heat exchanger channels 44 through which the airflow is urged. Thermal energy is transferred from the airflow into the heat exchanger 42, then from the heat exchanger 42 to the liquid coolant flowing through the cooling channels 34. The thermal energy is then dissipated outside the electric machine 10 via the liquid coolant exiting the electric machine through the one or more coolant exits 38. The heat exchanger 42 may be formed integral to the housing 26, and may be formed by casting to reduce the cost of the heat exchanger 42.

The rotor 12, utilizing the fan blades 40, maintains the flow of air through the machine such that when the heat is removed in the heat exchanger 42, the air circulates back to the stator end turns 24 and the permanent magnets 16 to absorb more thermal energy therefrom.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cooling system for a sealed permanent magnet electric machine comprising:
    one or more flow-driving devices disposed at a rotor of the electric machine configured to urge an airflow across a plurality of permanent magnets of the rotor and across a plurality of stator end turns of a stator of the electric machine to remove thermal energy therefrom;
    a plurality of cooling channels disposed in the electric machine in thermal communication with the stator configured to transfer thermal energy from the stator to a flow of fluid coolant through the plurality of cooling channels; and
    a coolant to air heat exchanger in thermal communication with the plurality of cooling channels to transfer thermal energy from the airflow to the fluid coolant, the coolant to air heat exchanger disposed radially inboard of the plurality of cooling channels, with the cooling channels disposed radially between the coolant to air heat exchanger and the stator;
    wherein the permanent magnets of the rotor are disposed radially outboard of the stator of the electric machine.

2. The cooling system of claim 1, wherein the one or more flow driving devices are a plurality of fan blades secured to the rotor.

3. The cooling system of claim 2, wherein the plurality of fan blades are formed integral to the rotor.

4. The cooling system of claim 2, wherein two or more fan blades of the plurality of fan blades have differing heights such that airflow across the fan blades is selectively directed toward the plurality of permanent magnets and the stator end turns.

5. The cooling system of claim 1, wherein the heat exchanger is formed integral to a housing of the electric machine.

6. The cooling system of claim 1, wherein the heat exchanger is formed by a casting process.

7. The cooling system of claim 1, wherein the fluid coolant is one or more of water, or water/ethyl glycol, or water/propylene glycol.

8. The cooling system of claim 1, wherein the fluid coolant is introduced to the housing via one or more coolant inlets.

9. The cooling system of claim 1, wherein the fluid coolant exits the housing via one or more coolant outlets.

10. The cooling system of claim 1, wherein the plurality of cooling channels extend substantially circumferentially around the stator.

11. The cooling system of claim 1, wherein the fluid coolant flows through the electric machine without flowing through the rotor.

12. A permanent magnet electric machine comprising:
a rotor including a plurality of permanent magnets;
a stator in magnetic communication with the rotor and positioned defining a radial air gap between the rotor and the stator, the permanent magnets of the rotor disposed radially outboard of the stator of the electric machine;
a housing configured to seal the rotor and the stator from an outside environment;
a plurality of fan blades secured to a rotor disc of the rotor, the plurality of fan blades including:
first fan blades located radially inboard of a plurality of stator end turns of the stator and directing air toward the stator end turns to remove thermal energy therefrom; and
second fan blades interposed between adjacent first fan blades and located radially inboard of the stator end turns to direct airflow to the permanent magnets to remove thermal energy therefrom, the second fan blades axially shorter than the first fan blades;
a plurality of cooling channels disposed in the electric machine in thermal communication with the stator configured to transfer thermal energy from the stator to a flow of fluid coolant through the plurality of cooling channels; and
a coolant to air heat exchanger in thermal communication with the plurality of cooling channels to transfer thermal energy from the airflow to the fluid coolant, the coolant to air heat exchanger disposed radially inboard of the plurality of cooling channels, with the cooling channels disposed radially between the coolant to air heat exchanger and the stator, the coolant to air heat exchanger including a plurality of heat exchanger channels through which the airflow is urged.

13. The electric machine of claim 12, wherein the plurality of fan blades are formed integral to the rotor.

14. The electric machine of claim 12, wherein the heat exchanger is formed integral to the housing of the electric machine.

15. The electric machine of claim 12, wherein the heat exchanger is formed by a casting process.

16. A method of cooling a sealed permanent magnet electric machine comprising:
moving a flow of fluid coolant through a plurality of cooling channels in thermal communication with a stator of the electric machine;
transferring thermal energy from the stator to the fluid coolant flowing through the plurality of cooling channels;
urging a circulation of air inside of the housing via rotation of a plurality of fan blades about a machine axis of the electric machine;
directing the circulation of air past a plurality of permanent magnets of a rotor of the electric machine and past a plurality of stator end turns of the stator, the permanent magnets of the rotor disposed radially outboard of the stator of the electric machine;
transferring thermal energy from the plurality of permanent magnets and from the plurality of stator end turns to the air; and
transferring thermal energy from the air to the fluid coolant via a coolant to air heat exchanger disposed radially inboard of the plurality of cooling channels, with the cooling channels disposed radially between the coolant to air heat exchanger and the stator.

17. The method of claim 16, comprising transferring thermal energy from the air to the fluid coolant via a heat exchanger disposed in the electric machine.

18. The method of claim 16, further comprising selectively directing portion of the airflow toward the plurality of permanent magnets and the stator end turns via the plurality of fan blades.

19. The method of claim 16, further comprising forming the plurality of fan blades integral to the rotor.

20. The method of claim 16, further comprising forming the heat exchanger integral to a housing of the electric machine.

* * * * *